United States Patent
Raahauge

(10) Patent No.: US 6,905,662 B2
(45) Date of Patent: Jun. 14, 2005

(54) ELIMINATION OF UNDESIRABLE VOLATILE ORGANIC BYPRODUCTS OF AN ALUMINA PROCESS

(75) Inventor: Benny E. Raahauge, Copenhagen (DK)

(73) Assignee: FFE Minerals Corp., Bethlehem, PA (US)

( * ) Notice: Subject to any disclaimer, the term of this patent is extended or adjusted under 35 U.S.C. 154(b) by 0 days.

(21) Appl. No.: 10/147,114

(22) Filed: May 16, 2002

(65) Prior Publication Data

US 2005/0025688 A1 Feb. 3, 2005

(51) Int. Cl.$^7$ .................................................. C01F 7/02
(52) U.S. Cl. ...................................... 423/130; 423/625
(58) Field of Search .......................... 423/130, 625, 423/245.1; 588/405; 502/415; 95/141

(56) References Cited

U.S. PATENT DOCUMENTS 3,268,295 A * 8/1966 Armbrust, Jr. et al. ..... 423/625
4,529,579 A * 7/1985 Raahauge ................... 423/625
5,946,818 A * 9/1999 Baxter et al. ................. 34/379

* cited by examiner

Primary Examiner—Steven Bos
(74) Attorney, Agent, or Firm—Daniel De Joseph

(57) ABSTRACT

Disclosed is a process for the elimination of volatile, foul-smelling organic compounds which are liberated in a gas suspension calciner process utilized to manufacture alumina. The process comprises recirculating captured alumina dust on which undesirable volatile organic compounds are adsorbed to a location in the manufacturing process (1) at or upstream (based on the path of the conveying gases) from the gas suspension calciner and (2) which is operating at a temperature of about 700 ° C. or higher. The adsorbed organic compounds are stripped off the alumina dust and are subsequently directed by process air into the gas suspension calciner furnace which is operating above 1000 ° C. under oxidizing conditions. Under such conditions the organic compounds are oxidized to $H_2O$ vapor and $CO_2$. It is a preferred feature that the volatilized organic compounds are adsorbed on the alumina dust in a baghouse.

2 Claims, 1 Drawing Sheet

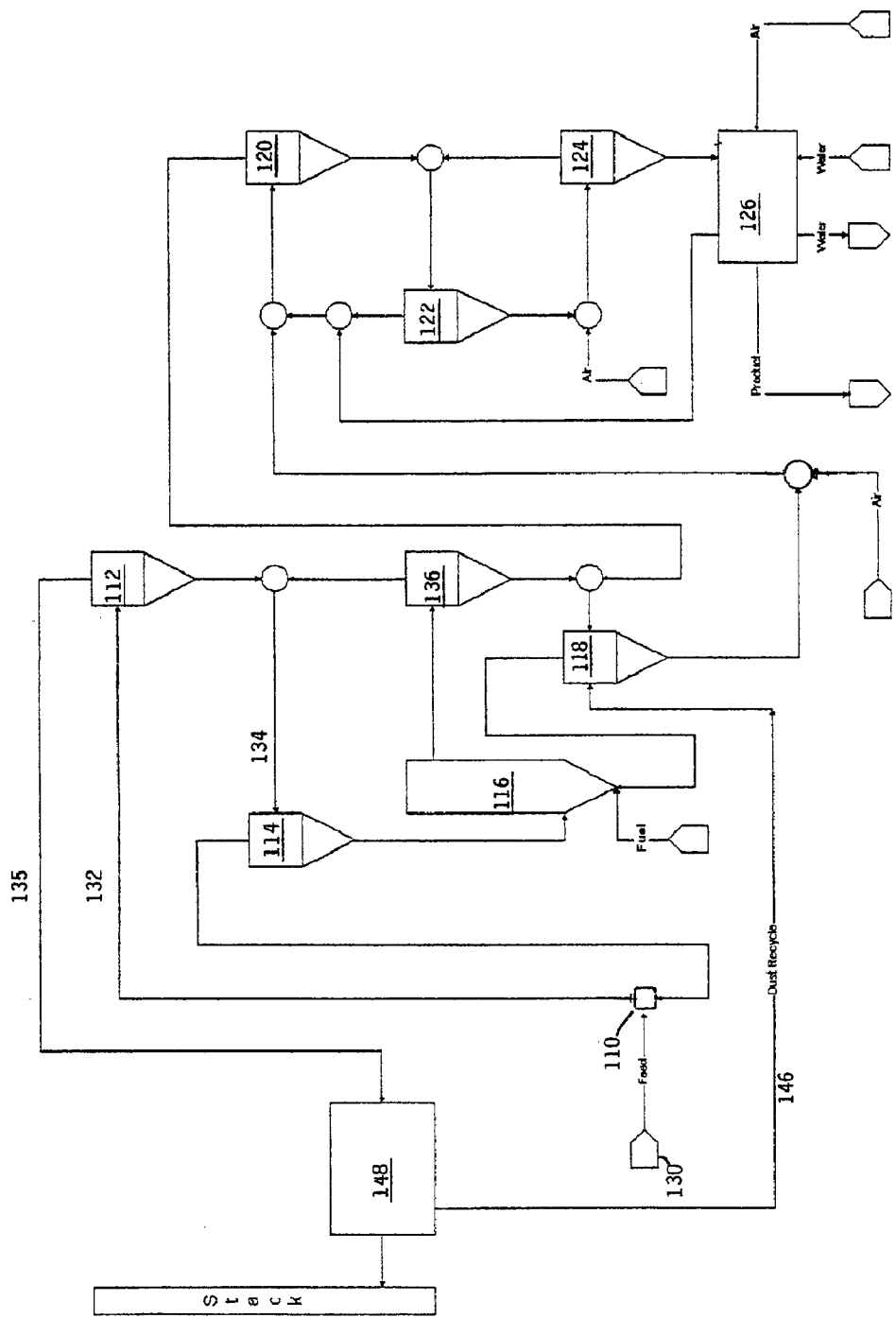
FIGURE

ELIMINATION OF UNDESIRABLE VOLATILE ORGANIC BYPRODUCTS OF AN ALUMINA PROCESS

The present invention relates to the elimination of volatile, undesirable, foul-smelling organic compounds liberated in a gas suspension calciner process utilized to manufacture alumina.

BACKGROUND OF THE INVENTION

The use of stationary so-called "gas suspension" calciners, in an alumina producing process in which particles are transported through drying, calcination and cooling zones is well known in the art. The resulting product may be separated by gravity, or by cycloning or filtration. The main components of a system to be used in such a process are a Venturi drier, a multi-stage cyclone preheater, a gas-suspension calciner, a multi-stage cyclone cooler, a secondary fluid-bed cooler, and a dust removal and recycling system which incorporates an electrostatic precipitator. A wet hydrate filter cake is fed to the flash drier and the dried material is then passed through different stages of the system. In such an apparatus the heated process gas moves in a general stage wise counter-current relationship to the material path, and typically moves through the cooler, the suspension calciner, the preheating/precalcining zone and finally to the dust removal and recycling system.

In an alumina manufacturing process undesirable organic materials are produced. These organics include, for example, benzene derivatives, aldehydes, and ketones. Such organic compounds are foul-smelling and typically originate from organic filter aids added to the hydrate filter to lower the moisture in the hydrate fed to the calciner or from organics dissolved in liquor pockets trapped in, or adsorbed to the hydrate crystals forming the hydrate particles as they are produced in the precipitation plant. Whatever the source, such organics never reach the gas suspension calciner, but are volatized in the 300–350° C. temperature range or lower, depending upon the volatility of the organics, during the preheating stage of the hydrate particles. The resulting gaseous volatile organic compounds exit the preheating chamber with the process gas and contribute to the odor in stack gases.

It is an object of the present invention, therefore, to effectively reduce the volatile, foul-smelling organics produced in a gas suspension calciner process utilized to manufacture alumina.

SUMMARY OF THE INVENTION

The above and other objects are achieved by a process comprising recirculating captured alumina dust on which undesirable volatile organic compounds are adsorbed to a location in the manufacturing process (1) at or upstream (based on the path of the conveying gases) from the gas suspension calciner and (2) which has a temperature of about 700° C. or higher. At such a location, the adsorbed volatile organic compounds (VOC's) are stripped off of the alumina dust and enter the air stream and are subsequently introduced into the gas suspension calciner furnace which is operating at above 1000° C. under oxidizing conditions. Under such conditions there is the in-situ destruction of the VOC's by their being oxidized to $H_2O$ vapor and $CO_2$ and, consequently, the elimination of the odors in the process. It is appreciated that some or all of the captured alumina dust on which undesirable volatile organic compounds are adsorbed can be recirculated directly to the gas suspension calcincer, where the above-described stripping and destruction steps occur in essentially one step.

This process takes advantage of the discovery that when a baghouse, rather than an electrostatic precipitator, is used in the dust removal and recycling system and the resident time of the alumina dust in such a baghouse is sufficiently long, the undesirable volatile organic compounds become adsorbed to the alumina dust in the baghouse. Therefore when such alumina dust containing adsorbed VOC's is recirculated, the VOC's are accordingly passed into the gas suspension calciner for ultimate destruction.

BRIEF DESCRIPTION OF DRAWINGS

Preferred embodiments of the present invention are described, by way of example and not to limit the invention, with reference to the accompanying drawing wherein:

The FIGURE is a schematic diagram of an embodiment of the present invention.

DESCRIPTION OF THE PREFERRED EMBODIMENTS

With reference to the Figure, the main components of the apparatus used in this process are depicted: (I) a preheating/precalcining zone, which in the depicted embodiment consists of (a) a preliminary drier 110, which is preferably a Venturi drier, and (b) a cyclone preheater, which is preferably a 2-stage cyclone preheater 112, 114; (II) a reaction chamber, which in the depicted embodiment consists of a gas- suspension calciner 116, (III) a cooling zone, which in the depicted embodiment consists of (a) a cyclone cooler, which is preferably a four-stage cyclone cooler 118, 120, 122, 124, and (b) a secondary fluid-bed cooler 126, and (IV) a dust removal and recycling system, which consists of a baghouse 148 and a recycle duct 146. The operation of this system and process is more fully described hereinbelow.

The term "baghouse" as used herein is well known in the art and refers to an enclosure in which there are baghouse filters for cleaning a gas by separating from the gas solid particles entrained therein. Each filter bag is generally a cylindrically elongated porous fabric member having an open end which is attached to a tube sheet. In operation a dirty gas, i.e., a gas laden with entrained solid particles, is drawn through the baghouse. Entering through one chamber as dirty gas, the gas passes through the fabric filters to leave through the other chamber as a clean gas. As the gas flows through the fabric, the entrained solid particles being too large to pass through the pores of the fabric collect on the surface of the fabric and are thereby filtered from the gas.

Wet filter cake (alumina trihydrate) from feed source 130 containing undesirable liquid organics enters the Venturi drier 110 at a temperature of about 60° C. The material dried in the flash drier is carried to the first or upper preheater cyclone 112 by the process gas flow in pipe 132. The dry aluminum hydroxide is preheated in the preheating and precalcining zone to a temperature range between about 150° C. up to but not exceeding about 450° C. to remove free and combined water.

The dry aluminum hydroxide from the upper preheater cyclone 112 is preheated and partly calcined in the gas duct 134 to the second preheater cyclone 114. During the preheating step, in the area of the preheater at which the temperatures are in the range of approximately 300° C. to approximately 350° C., the undesirable liquid VOC's are sublimating from the partially calcined alumina particles and transferred to the gas phase. The now-gaseous organic compounds leave the calciner unit from cyclone 112, together with fine alumina dust, and transported by the gas flow to the baghouse via duct 135 for de-dusting operating at a temperature of approximately 130–180° C. In a prior art process such organics would exit the dust removal and recycling system with the stack gas.

Returning to the preheated alumina trihydrate, it is separated from the gas in the second preheater cyclone 114 and discharged into the gas suspension reactor or calciner. The preheating operation serves to therefore remove free and combined water from the preheated/precalcined alumina trihydrate.

In the gas suspension reactor or calciner 116 fuel is mixed into a rising stream of hot air coming from a cooling cyclone 118. The fuel is atomized and ignited in the rising stream of hot air, and burned in the gas suspension reactor or calciner simultaneously with alumina is being recrystallized while entrained in the combustion gas which is rising in the reactor or calciner during a retention time of a few seconds at a temperature of 1000° C.–1600° C., the specific temperature being chosen in accordance with procedures recognized in the art. Recrystallized alumina is separated from the hot gases in the disengaging cyclone 136, mixed with fines from the dust removal and recycling system as per the process described below, then discharged into the 4-stage cyclone cooler, 118, 120, 122, 124.

The alumina is cooled in the cyclone cooler to a temperature of approximately 250° C. or below, by overall stage wise countercurrent heat exchange with the air used for combustion of fuel in the calciner.

The temperature of the final alumina product is then reduced to 80° C. or below, in the secondary cooler 126, where the alumina product is cooled indirectly by water flowing countercurrently to the alumina.

With reference again to the undesirable VOC's, the fine alumina dust also being transported by the exiting gaseous stream acts as an in-situ adsorbent for the volatile organic compounds, and the volatile organic compounds come in contact with and adhere to the dust, typically where the dust is entrained in the filter medium of the bag house used in the dust removal system. The captured alumina dust is then recycled back via duct 146 into the process air stream at a point in the cooling zone of the gas suspension calciner unit, such as the cone of cooling cyclone 118 or disengaging cyclone 136, that is operating above 700° C. to ensure partial calcinations of hydrate carry-over from cyclone 112 (a hydrate by-pass), resulting in the stripping off of the adsorbed VOC's from the fine alumina dust and insertion of the gaseous VOC's into the air stream. The process air stream, along with the VOC's, are directed for utilization as process air for combustion in the gas suspension calciner which, due to its operating above 1000° C. under oxidizing conditions, results in the in-situ destruction of the VOC's into water vapor and carbon dioxide. Alternatively and depending upon process conditions (a) some or all of the captured alumina dust on which undesirable volatile organic compounds are adsorbed can be recirculated directly to the gas suspension calcincer, where the above described stripping and destruction occurs in essentially one step and/or (b) some of the fine captured alumina dust may be sent directly to product.

It has been the general view that in a gas suspension calciner process for the production of alumina an electrostatic precipitator is to be incorporated in the dust removal and recycling system. It has now been discovered that the filter of the baghouse is an ideal medium on which the gaseous VOC's are adsorbed onto the fine alumina dust. This adsorption process is facilitated when there is a relatively high retention time of the alumina dust on the bags in the bag house, that is, at least about 20–30 seconds, thus giving ample opportunity for the VOC's to come into contact with the fine alumina dust. It has been discovered that such fine alumina dust is an excellent in-situ adsorbent for the VOC's, in part because it has a relatively high specific surface area of about 150–200 m²/gr. The above advantages are not available with an electrostatic precipitator and, consequently, when an electrostatic precipitator is incorporated in the dust removal and recycling system rather than a baghouse a much higher percentage of undesirable gaseous organics are incorporated in the stack gases.

It is not intended to limit the present invention to the specific embodiments described above. It is recognized that other changes may be made in the method and apparatus specifically described herein without deviating from the scope and teachings of this invention. It is intended to encompass all other embodiments, alternatives and modifications consistent with the present invention.

What is claimed is:

1. A method for eliminating undesirable organic compounds which are byproducts of a process for producing anhydrous alumina from alumina trihydrate comprising:
   (a) preheating alumina trihydrate containing undesirable liquid organic compounds, in process gas in a preheating zone, wherein said liquid organic compounds are converted to gaseous organic compounds;
   (b) directing the gaseous organic compounds along with fine alumina dust from the process for producing an hydrous alumina alumina trihydrate to a dust removal system, with the gaseous organic compounds being adsorbed on the fine alumina dust;
   (c) recycling the fine alumina dust with the gaseous organic compounds adsorbed thereon from the dust removal system into a process gas stream at a temperature sufficient to strip off the adsorbed organic compounds from the fine alumina dust and to volatilize said organic compounds; and
   (d) oxidizing the volatilized organic compounds to water vapor and carbon dioxide.

2. A method for eliminating undesirable volatile organic compounds which are byproducts of a process for producing anhydrous alumina from alumina trihydrate comprising:
   (a) preheating alumina trihydrate containing undesirable liquid organic compounds, in process gas in a preheating zone, wherein said liquid organic compounds are converted to a gaseous state at a point in the preheating zone where temperatures therein range from approximately 300° C. to approximately 350° C.;
   (b) directing the gaseous organic compounds along with fine alumina dust from the alumina trihydrate to a dust removal system comprising a baghouse having a filter medium for capturing the fine alumina dust, with the gaseous organic compounds being adsorbed on the fine alumina dust while such dust is captured by the filter medium;
   (c) introducing said preheated alumina trihydrate into a reaction chamber where it is heat treated into recrystallized alumina in process gas at a temperature of approximately 1000° C. to approximately 1600° C.;
   (d) directing said recrystallized alumina to a cooling zone;
   (e) recycling the fine alumina dust with the organic compounds adsorbed thereon from the baghouse into a process gas stream located at a first point upstream of the reaction chamber, based on the flow direction of the process gas, which first point is at a temperature of at least 700° C., resulting in the stripping of the adsorbed organic compounds off the fine alumina dust and the volatilization of said organic compounds; and
   (f) introducing the process gas and the volatilized organic compounds into the reaction chamber being maintained at temperatures above 1000° C., in which the volatilized organic compounds are destroyed by being oxidized to water vapor and carbon dioxide.

* * * * *